Figure 1:
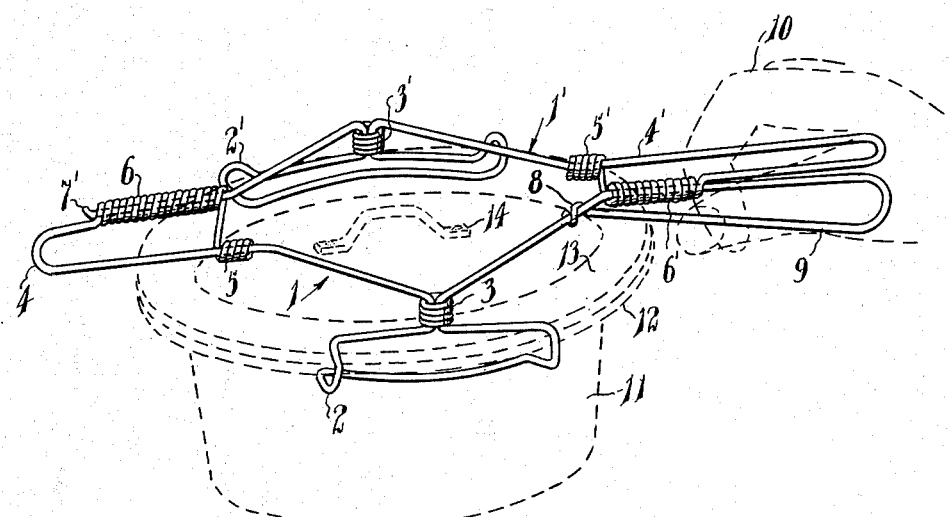

Nov. 10, 1953

F. O. CRICH 2,658,788

POT LIFTER

Filed Oct. 17, 1950

INVENTOR
FRANK OMAR CRICH

ATTY.

Patented Nov. 10, 1953

2,658,788

UNITED STATES PATENT OFFICE 2,658,788

POT LIFTER

Frank O. Crich, Toronto, Ontario, Canada

Application October 17, 1950, Serial No. 190,464

3 Claims. (Cl. 294—30)

This invention relates to a lifter for pots, pans, dishes, casseroles, cake tins, lids and the like, the lifter having a rotatable jaw to grip vessels of varying diameters.

Plate and pot lifters which have heretofore been constructed all suffer from the disadvantages that they are difficult to manipulate and, because they require a strong wrist, are unsuitable for lifting heavy pots. They are also unsuitable for operations such as draining liquids from a pot.

The object of this invention is to provide an easily manipulated pot holder of light and inexpensive material which will enable the user to firmly grasp and readily lift a heavy pot, to carry it, for instance, to a sink, to tilt it in order to drain off any liquid, and otherwise to deal with it without danger of dropping it and without wrist strain.

This object is attained by providing a handle at each end of the lifter and by providing a simple mechanism actuated from both ends for engaging and disengaging the lifter with a pot. Additionally, means may be provided to operate the lifter from one end in cases where the pot is in an oven or otherwise located so that both handles cannot be grasped.

Figure 2:
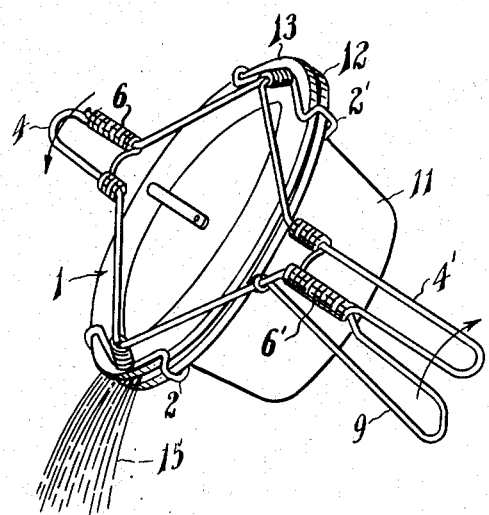

In drawings which illustrate this invention, and in which like reference numerals indicate corresponding parts in the several views:

Fig. 1 is a perspective view of a lifter constructed in accordance with this invention, the view showing how the lifter may be used to grip a vessel; and Fig. 2 is a perspective view showing how the lifter may be used to drain liquid from a vessel.

In Fig. 1, the lifter is constructed of two suitably bent wires 1, 1'. A jaw or clamping portion 2, 2' is formed in the middle part of each wire by bending each end of the wire back on itself to form an elongated loop and then bending the ends of the wire away from the loop. The ends may be bound together with wire 3, 3' where they leave the loop. The sides of each elongated loop are pressed towards each other so that the ends of the loop become sufficiently bowed to clamp around the rim of a vessel, and the sides of the of the loop are given a slight curvature to conform to the circumferential curvature of the vessel. The jaw thus assumes the shape of a cradle.

An elongated loop or handle 4, 4' is formed at one end of each wire by bending the end back and twisting it about the wire as shown at 5, 5'. Handle 4' may be longer than handle 4, as shown. A hollow coil 6, 6', made up of one or more small loops, is formed from the wire on one side of each handle. The end of wire 1 remote from handle 4 is passed through coil 6 and then given a hook 7 to prevent disengagement from the coil. Wire 1 is free to rotate in coil 6. Similarly, the end of wire 1 remote from handle 4 is passed though coil 6' and is free to rotate therein. This end is then bent back on itself and twisted around wire 1 at a point 8 between jaw 2 and coil 6. An elongated loop 9 is therefore formed in wire 1, and in the embodiment shown loop 9 underlies loop 4. Loop 9 forms a lever for the lifter; the lever being normally spaced apart from handle 4' with which it is pivotally mounted. When lever 9 is rotated towards handle 4', jaw 2 is caused to approach jaw 2', and conversely when lever 9 is rotated away from handle 4', the jaws may be spread apart.

In dotted lines, Fig. 1 shows how the lifter may be operated with only one hand 10 to hold a pot 11. The pot has a rim 12 and a lid 13 having a handle 14. In order to grasp the pot, lever 9 is rotated toward handle 4' until jaws 2, 2' are clamped around rim 12 and lid 13. Being operable from handle 4' only, the lifter is very useful for handling pie plates in an oven, and all parts of the oven can be reached since handle 4 is normally relatively short.

Fig. 2 shows how the lifter may be used to drain liquid from a vessel, as for example to drain water off vegetables. The lifter is grasped with both hands, for a firm grip, and jaws 2, 2' are clamped to rim 12 and lid 13 by twisting handles 4, 4' in opposite senses as indicated by the arrows. Each handle exerts leverage on the jaw of the other wire, since coils 6, 6' are eccentric to handles 4, 4' respectively. The vessel is tilted until lid 13 and pot 11 move apart sufficiently to allow the liquid 15 to drain out.

The lifter may be simplified by eliminating lever 9 and giving wire 1 a hook similar to hook 7' on wire 1'. Such a simplified lifter would have to be held at both ends.

Other types of handles, such as wooden handles, may be used, the essential feature being that each wire is rotatably mounted at the handle end of the other wire.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. A lifter comprising a pair of elongated clamp members each having a clamping portion substantially midway between its ends, the members having pivotal connections to each other near their ends for rotation relative to each other, one member having a handle at one end and the other member having a handle at the other end, each handle being disposed substantially parallel to the axis of rotation of the members and comprising an elongated loop of wire having a smaller loop formed in one side of the said elongated loop, each member having a portion passing through and free to rotate in the said smaller loop in the handle of the other member to form said pivotal connections, and the members being rotatable relative to each other by twisting the handles in opposite senses.

2. A lifter comprising a pair of elongated wire clamp members each having a cradle-shaped wire clamping portion formed substantially midway between its ends, the members having pivotal connections to each other near their ends for rotation relative to each other, one member having a handle at one end and the other member having a handle at the other end, the handles being disposed substantially parallel to the axis of rotation of the members and each handle comprising an elongated wire loop at one side of which the other member is pivotally connected forming said pivotal connections, and the members being rotatable relative to each other by twisting the handles in opposite senses.

3. A lifter comprising a pair of elongated wire clamp members each having a wire clamping portion formed substantially midway between its ends, the members having pivotal connections to each other near their ends for rotation relative to each other, one member having an actuating lever at one end and a handle at the other end and the other member having a handle at said one end, the handles being disposed substantially parallel to the axis of rotation of the members and each handle comprising an elongated wire loop having a hollow coil formed in one side, the end of each member remote from its handle passing through and being free to rotate in the said hollow coil of the other member to form said pivotal connections, and the members being rotatable relative to each other by moving the actuating lever of the one member relative to the handle of the other member or by twisting the handles in opposite senses.

FRANK O. CRICH.

References Cited in the file of this patent

UNITED STATES PATENTS

| Number | Name | Date |
| --- | --- | --- |
| 311,478 | Flansburgh | Feb. 3, 1885 |
| 564,285 | Johnson | July 21, 1896 |
| 1,368,953 | Mann | Feb. 15, 1921 |
| 1,627,524 | Morris | May 3, 1927 |

FOREIGN PATENTS

| Number | Country | Date |
| --- | --- | --- |
| 360,601 | Great Britain | Nov. 12, 1931 |